(12) United States Patent
Wang (10) Patent No.: US 10,421,160 B2
(45) Date of Patent: Sep. 24, 2019

(54) ALLOYING COMPOSITION FOR SELF-SHIELDED FCAW WIRES WITH LOW DIFFUSIBLE HYDROGEN AND HIGH CHARPY V-NOTCH IMPACT TOUGHNESS

(71) Applicant: The ESAB Group, Inc., Florence, SC (US)

(72) Inventor: Wesley W. Wang, Mechanicsburg, PA (US)

(73) Assignee: THE ESAB GROUP, INC., Florence, SC (US)

( * ) Notice: Subject to any disclaimer, the term of this patent is extended or adjusted under 35 U.S.C. 154(b) by 862 days.

(21) Appl. No.: 13/792,462

(22) Filed: Mar. 11, 2013

(65) Prior Publication Data
US 2014/0251974 A1  Sep. 11, 2014

(51) Int. Cl.
B23K 35/362 (2006.01)
B23K 35/02 (2006.01)
B23K 35/36 (2006.01)

(52) U.S. Cl.
CPC ........ B23K 35/362 (2013.01); B23K 35/0261 (2013.01); B23K 35/0266 (2013.01); B23K 35/3602 (2013.01); B23K 35/3605 (2013.01)

(58) Field of Classification Search
CPC ............ B23K 35/0261; B23K 35/3602; B23K 35/3605; B23K 35/362
USPC ................................ 219/145, 145.22, 146.1
See application file for complete search history.

(56) References Cited

U.S. PATENT DOCUMENTS

| 3,134,924 A | * | 5/1964 | Henderson | ............. | H01J 17/06 |
| | | | | | 313/14 |
| 3,566,073 A | | 2/1971 | Black | | |
| 3,702,390 A | * | 11/1972 | Blake et al. | ............. | 219/146.52 |
| 3,767,891 A | | 10/1973 | Haverstraw et al. | | |
| 3,911,244 A | | 10/1975 | Nakamura et al. | | |

(Continued)

FOREIGN PATENT DOCUMENTS

| GB | 2155045 A | 9/1985 |
| JP | S52-031938 A | 3/1977 |

(Continued)

OTHER PUBLICATIONS

Smith, D.C. and Johannes, D.P., 1968, "Development of a Notch-Tough Self-Shielded Flux-Cored Electrode", Welding Journal, March, p. 207-214.

(Continued)

*Primary Examiner* — Tu B Hoang
*Assistant Examiner* — Thomas J Ward
(74) *Attorney, Agent, or Firm* — Edell, Shapiro & Finnan, LLC (57) ABSTRACT

A self-shielded flux cored arc welding electrode is disclosed including a ferrous metal sheath and a core within the sheath enclosing core ingredients comprise a composition window of aluminum, manganese and rare earth metals in wires of about 2.0-3.0 wt. % [Al], 1.0-2.0 wt. % [Mn] and 0.001-0.11 wt. % rare earth metals or 0.001-0.5% rare earth metal oxides, such as, but not limited to, La, Ce, etc. Resulting welds include 0.7-1.0 wt. % [Al] and 1.1-1.5 wt. % [Mn]. Resulting welds have a maximum diffusible hydrogen content of 5 mL/100 g or less, Resulting welds also have a Charpy V-notch toughness at −40° F. of at least 100 ft-lbs.

18 Claims, 4 Drawing Sheets

(56) References Cited

U.S. PATENT DOCUMENTS

| | | | |
|---|---|---|---|
| 4,186,293 A | | 1/1980 | Gonzalez et al. |
| 4,551,610 A | * | 11/1985 | Amata ..................... 219/146.3 |
| 4,571,480 A | * | 2/1986 | Sakai .................. B23K 35/368 |
| | | | 219/145.22 |
| 4,717,536 A | | 1/1988 | Chai et al. |
| 4,803,340 A | | 2/1989 | Sato et al. |
| 4,833,296 A | | 5/1989 | Crockett et al. |
| 4,843,212 A | * | 6/1989 | Shneerov et al. ....... 219/146.23 |
| 7,812,284 B2 | | 10/2010 | Narayanan et al. |
| 2009/0321404 A1 | | 12/2009 | Keegan |
| 2010/0102049 A1 | | 4/2010 | Keegan |
| 2013/0270246 A1 | * | 10/2013 | Okazaki et al. ..... 219/137 WM |

FOREIGN PATENT DOCUMENTS

| | | |
|---|---|---|
| JP | S56-74395 A | 6/1981 |
| JP | S59-56997 A | 4/1984 |
| JP | S60-152393 A | 8/1985 |
| JP | 61169196 A | 7/1986 |
| JP | 63273594 A | 11/1988 |
| JP | H05-228691 A | 9/1993 |
| JP | H05-237693 A | 9/1993 |
| JP | 9-94695 | 4/1997 |
| JP | H10-180487 A | 7/1998 |
| JP | 2010-269335 A | 12/2010 |
| WO | 2010046769 A1 | 4/2010 |
| WO | 2010052534 A1 | 5/2010 |

OTHER PUBLICATIONS

Smith, D.C., 1970, "Flux-Cored Electrodes—Their Composition and Use", Welding Journal, July, vol. 49, p. 535-542.

Kaplan, H.I. and Hill, D.C., 1976, "Thermodynamics of Air-Operating Flux Cored Electrodes and an Analysis of Weld Toughness", Welding Journal, vol. 55, January, p. 13s-19s.

Grong, Ø, Kluken, A.O. and Bjørnbakk, B, 1988, "Effect of nitrogen on weld metal toughness in self-shielded flux-cored arc welding", Joining & Materials, October, vol. 1, No. 4, p. 164-169.

Abson, D.J. and Pargeter, R.J., 1986, "Factors influencing as-deposited strength, microstructure and toughness of manual metal arc welds suitable for C—Mn steel fabrications", International Metals Reviews, vol. 31, No. 4, p. 141-194.

Killing, R., 1980, "Welding with self-shielded wires—the mechanism of shielding and droplet transfer", Metal Construction, Sep., vol. 12, No. 9, p. 433-436.

Dickehut, G. and Hotz, U., 1991, "Effect of Climatic Conditions on Diffusible Hydrogen Content in Weld Metal", Welding Journal, January, vol. 70, No. 1 p. 1s-6s.

Maroef, I. and Olson, D.L. "Evaluation of Hydrogen Trapping for Hydrogen Management in Steel Welding", Proceedings of the 6 International Conference on Trends in Welding Research, Apr. 15-19, 2002, pp. 557-562, Pine Mountain, Georgia, ASM Intl., Materials Park, OH, (2003).

Maroef, I.S., Park, Y.D., Lensing, C.A., Olson, D.L., Landau, A, 1999, "Hydrogen trapping in high strength steel weld metal", Materials Solutions '99, Cincinnati, OH, Nov. 1-4, 1999.

Olson, D.L., Wang, W. and Liu, S., 1995, "Use of Martensite Start Temperture for Hydrogen control", Welding and Weld Automation in Shipbuilding, TMS, Oct. 1995, p. 17-p. 31.

C.R. Heiple and P. Burgardt, 1993, "Fluid Flow Phenomena during Welding", ASM Handbook, 9th edition, vol. 6, p. 20.

Liu, S., 2012, "Pyrometallurgical Studies of Molten Metal Droplets for the Characterization of Gas Metal Arc Welding", a Keynote on the 9th International Conference on Trends in Welding Research.

Wang, Wesley and Liu, S., 2012, "Nature and Behavior of Fluxes Used for Welding", ASM Handbook, 10th edition, vol. 6A, p. 43-54.

Thewlis, G, 2004, "Classification and quantification of microstructures in steels", Materials Science and Technology, vol. 20, p. 143-160.

Park, Y.D., Maroef, I.S., Landau, A. and Olson, D.L., 2002, "Retained Austenite as a Hydrogen Trap in Steel Welds", Welding Journal, February, p. 27-s to p. 35-s.

Olson, D.L., Wang, W. and Liu, S., 1995,"Martensite Start Temperature As a Weldability Index", International Trends in Welding Science and Technology, Gatlinburg, June, 1995, p. 615-620.

Olson, D.L., Wang, W. and Liu, S., 1996, "Consequences of Weld Overmatching and Undermatching: Non-Uniform Hydrogen Distribution", ASME-OMAE, Materials Engineering, Jun. 1996, vol. 3, p. 403-405.

Olson, D.L., Maroef, I., Lensing, C., Smith, R.D., Wang, W., 1996, "Hydrogen Management in High Strength Steel Weldments", Proceedings of the Joint Seminar, Hydrogen Management in Steel Weldments, Oct. 23, 1996, p. 1-19.

Wang, Wesley and S, Liu, 2002, "Alloying and Microstructural Management in Developing SMAW Electrodes for HSLA100 Steel", "Welding Research Supplement" of Welding Journal, July, p. 132-s to 145-s.

PCT International Search Report and Written Opinion for International Application PCT/US2014/020621, dated Jun. 26, 2014.

European Search Report dated Oct. 28, 2016 for European Patent Application No. 14779456.4.

* cited by examiner

ALLOYING COMPOSITION FOR SELF-SHIELDED FCAW WIRES WITH LOW DIFFUSIBLE HYDROGEN AND HIGH CHARPY V-NOTCH IMPACT TOUGHNESS

BACKGROUND OF THE INVENTION

Field of the Invention

Embodiments of the invention generally relate to welding electrodes, and more particularly to an improved welding electrode with low diffusible hydrogen and high Charpy V-notch impact toughness.

Discussion of Related Art

Self-shielded flux cored arc welding (SS-FCAW) has been widely applied to various fabrication industries since the middle of the last century. Its high efficiency and consistent bead quality can significantly reduce the fabrication time and project cost as compared to other welding methods, which is of great importance to fabrication projects in rural areas, such as transcontinental pipeline fabrication and offshore structures installation. On the other hand, due to direct air-exposure, the arc of SS-FCAW can be much harsher with more spattering than a gas-shielding welding arc. The arc disturbance also brings about a negative impact in the control of diffusible hydrogen, oxygen, and nitrogen in the weld metals, and the microstructure evolution and mechanical properties of the welds.

It is known that low diffusible hydrogen content in low carbon steel welds can greatly benefit the cracking resistance and steel fabrication cost and efficiency. Specifically, it is known that minimizing the amount of diffusible hydrogen in deposited weld metal can minimize the possibility of hydrogen related cracking in the resulting weld. Improved self-shielded flux cored wires at the H8 level (i.e., electrodes or electrode-flux combinations capable of depositing weld metal with a maximum diffusible hydrogen content of 8 mL/100 g) have been developed which exhibit good welding performance with a gentle and stable arc, easy-to-command slag flow and robust mechanical properties. Even though the arc performance is designed to be close to a gas-shielding flux cored welding arc, the diffusible hydrogen content of such electrodes still remains at the H8 level, which limits its adoption in fabrication of more critical steel structures.

Prior attempts to reduce the diffusible hydrogen content in low carbon steel welds involved the excessive addition of fluorides to the core mix. The problem with adding fluorides, however, is that it causes fluid slag flow and an unstable arc which may results in failure in out of position welding. It also requires additional aluminum in the core to perform de-oxidation and de-nitridation. As a result, excessive aluminum is retained in the weld, causing grain coarsening and resulting in poor Charpy V-notch impact toughness.

With the increase in high strength steel welding applications, diffusible hydrogen control in weld metal has received increased attention. As a result, there is a need for an improved self-shielded flux cored wire featuring both low diffusible hydrogen content and excellent all-positional welding performance coupled with robust mechanical properties.

In particular, there is a need for an improved self-shielded flux cored wire at or below the 5 ml/100 g level (i.e. the H5 level) that is equivalent to the diffusible hydrogen content achievable using a gas-shielding weld. The improved self-shielded flux-cored welding electrode should also have high Charpy V-notch impact toughness.

SUMMARY OF THE DISCLOSURE

A flux cored welding electrode is disclosed. The electrode may include a ferrous metal sheath and a core within the sheath including core ingredients. The core ingredients may comprise, in weight percent based on the total weight of the wire: 2.0-3.0 aluminum; 1.0-2.0 manganese; and 0.001-0.35 rare earth metal oxide. The flux cored welding electrode is capable of yielding a weld having a diffusible hydrogen level of 5 ml/100 g or less and a Charpy V-notch toughness at −40° F. of at least 100 ft-lbs. The rare earth metal of the rare earth metal oxide comprises up to 0.11 wt. % of the total weight of the metal sheath and core ingredients. The rare earth metal oxide may comprise a plurality of rare earth metal oxides. The rare earth metal oxide may include $Ce_2O_3$—$La_2O_3$—$Nd_2O_3$—$Pr_2O_3$. The core ingredients further comprise, in weight percent, based on the total weight of the wire: 9.54 of a first sintered fluoride; 4.53 sintered oxide; 0.42 of a second sintered fluoride; 2.04 aluminum; 1.77 magnesium; 1.00 manganese; 0.87 nickel 0.21 $Ce_2O_3$—$La_2O_3$—$Nd_2O_3$—$Pr_2O_3$; and 0.36 iron. The first sintered fluoride may comprise $BaLiF_3$, the sintered oxide may comprise $Li_2O$—$CaO$—$SiO_2$—$Fe_3O_4$ and the second sintered fluoride may comprise $KLiF_2$. The core ingredients may further comprise, in weight percent, based on the total weight of wire: 9.34 of a first sintered fluoride; 4.53 sintered oxide; 0.83 of a second sintered fluoride; 2.10 aluminum; 1.77 magnesium; 1.01 manganese; 0.98 nickel; 0.10 $Ce_2O_3$—$La_2O_3$—$Nd_2O_3$—$Pr_2O_3$; and 0.03 iron. The first sintered fluoride may comprise $BaLiF_3$, the sintered oxide may comprise $Li_2O$—$CaO$—$SiO_2$—$Fe_3O_4$ and the second sintered fluoride comprises $KLiF_2$. The core ingredients may further comprise, in weight percent, based on the total weigh of wire: 9.13 of a first sintered fluoride; 4.51 sintered oxide; 0.42 of a second sintered fluoride; 2.04 aluminum; 1.77 magnesium; 0.96 manganese; 0.87 nickel; 0.44 zirconium dioxide; 0.07 $Ce_2O_3$—$La_2O_3$—$Nd_2O_3$—$Pr_2O_3$; and 0.53 iron. The first sintered fluoride may comprise $BaLiF_3$, the sintered oxide may comprise $Li_2O$—$CaO$—$SiO_2$—$Fe_3O_4$ and the second sintered fluoride may comprise $KLiF_2$.

A flux composition for a cored welding electrode is disclosed. The flux composition may comprise, in weight percent based on the total weight of the wire: 2.0-3.0 aluminum; 1.0-2.0 manganese; and 0.001-0.11 rare earth metal. The rare earth metal may comprise a rare earth metal oxide. The rare earth metal oxide may com$Ce_2O_3$—$La_2O_3$—$Nd_2O_3$—$Pr_2O_3$. The composition may comprise, in weight percent, based on the total weight of the wire: 9.54 of a first sintered fluoride; 4.53 sintered oxide; 0.42 of a second sintered fluoride; 2.04 aluminum; 1.77 magnesium; 1.00 manganese; 0.87 nickel; 0.07 rare earth metals selected from the list consisting of Ce, La, Nd and Pr; and 0.36 iron. The first sintered fluoride may comprise $BaLiF_3$, the sintered oxide may comprise $Li_2O$—$CaO$—$SiO_2$—$Fe_3O_4$ and the second sintered fluoride may comprise $KLiF_2$. The composition may comprise, in weight percent, based on the total weight of the wire: 9.13 of a first sintered fluoride; 4.53 sintered oxide; 0.83 of a second sintered fluoride; 2.10 aluminum; 1.77 magnesium; 1.01 manganese; 0.98 nickel; 0.04 rare earth metals selected from the list consisting of Ce, La, Nd and Pr; and 0.83 iron. The first sintered fluoride may comprise $BaLiF_3$, the sintered oxide may comprise $Li_2O$—$CaO$—$SiO_2$—$Fe_3O_4$ and the second sintered fluoride may comprise $KLiF_2$. The composition may comprise, in weight percent, based on the total weight of the wire: 9.13 of a first sintered fluoride; 4.51 sintered oxide; 0.42 of a second sintered fluoride; 2.04 aluminum; 1.77 magnesium; 0.96 manganese; 0.87 nickel; 0.44 zirconium dioxide; 0.03 rare earth metals selected from the list consisting of Ce, La, Nd and Pr; and 0.53 iron. The first sintered fluoride may comprise $BaLiF_3$, the sintered oxide may comprise $Li_2O$—$CaO$—$SiO_2$—$Fe_3O_4$ and the second sintered fluoride may comprise $KLiF_2$.

A flux cored welding electrode is disclosed, comprising a ferrous metal sheath and a core within the sheath including core ingredients, the core ingredients comprising, in weight percent based on the total weight of the wire: 2.0-3.0 aluminum; 1.0-2.0 manganese; and 0.001-0.5 rare earth metal oxide. The flux cored welding electrode may be capable of yielding a weld having a diffusible hydrogen level of 5 ml/100 g or less and a Charpy V-notch toughness at −40° F. of at least 100 ft-lbs.

BRIEF DESCRIPTION OF THE DRAWINGS

The accompanying drawings illustrate preferred embodiments of the disclosed method so far devised for the practical application of the principles thereof, and in which.

DESCRIPTION OF EMBODIMENTS

Various welding electrode embodiments are described in this specification to provide an overall understanding of the invention. It is understood that the various embodiments described in this specification are non-limiting and non-exhaustive. Thus, the invention is not limited by the description of the various non-limiting and non-exhaustive embodiments disclosed in this specification. In appropriate circumstances, the features and characteristics described in connection with various embodiments may be combined with the features and characteristics of other embodiments. Such modifications and variations are intended to be included within the scope of this specification. As such, the claims may be amended to recite any steps, elements, limitations, features, and/or characteristics expressly or inherently described in, or otherwise expressly or inherently supported by, this specification. Further, Applicants reserve the right to amend the claims to affirmatively disclaim steps, elements, limitations, features, and/or characteristics that are present in the prior art regardless of whether such features are explicitly described herein. Therefore, any such amendments comply with the requirements of 35 U.S.C. § 112, first paragraph, and 35 U.S.C. § 132(a). The various embodiments disclosed and described in this specification can comprise, consist of, and/or consist essentially of the elements, limitations, features, and/or characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

The grammatical articles "one", "a", "an", and "the", if and as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Self-shielded flux cored welding produces unique characteristics of weld metal microstructure and distribution. In addition to conventional microstructural constituents, including ferrite, ferrite as a second phase aligned, acicular ferrite, and the like, another type of second phase ferrite has been found in a weaved morphology. Hence, the microstructural characteristics of an E71T8-Ni1 type weld were investigated by changing major alloying elements of Mn and Al from 1.0-1.5 wt. % and 0.7-0.9 wt. %, separately. The inventor has discovered that increasing the amount of both weaved ferrite and acicular ferrite benefits the Charpy V-notch impact toughness of self-shielded FCAW welds that were dominated by ferrite. Having such a predominant ferrite composition in welds, and with a low manganese content (i.e., ~0.7%), can cause fluctuations in the Charpy V-notch impact toughness at −40 F. Therefore, it can be important to optimize the alloying of manganese and aluminum in the welds to ensure robust mechanical properties.

The inventor has further discovered that the addition of rare earth metals in the welds is an effective way to greatly benefit the impact toughness and to reduce the diffusible hydrogen content to the H5 level (i.e., electrodes or electrode-flux combinations capable of depositing weld metal with a maximum diffusible hydrogen content of 5 mL/100 g), while maintaining a desired high Charpy V-notch toughness (e.g., at least 100 ft-lbs at −40 F).

Rare earth metals can serve as trapping sites to arrest diffusible hydrogen in welds, in addition to its arc stability effect which benefits the reduction of diffusible hydrogen. The present disclosure shows that adding rare earth metals from 0.001 to 0.11 wt. % in self-shielded flux-cored wires can effectively reduce the diffusible hydrogen down to the H5 level. It will be appreciated that rare earth oxides contain various rare earth metals including, but not limited to, Cerium (Ce), Lanthanum (La), Neodymium (Nd), Praseodymium (Pr), Scandium (Sc), and Yttrium (Y). An exemplary list of appropriate rare earth metal oxides includes, but is not limited to, $Sc_2O_3$, $Y_2O_3$, $La_2O_3$, $Ce_2O_3$, $CeO_2$, $Nd_2O_3$, and $Pr_2O_3$.

Figure 1:
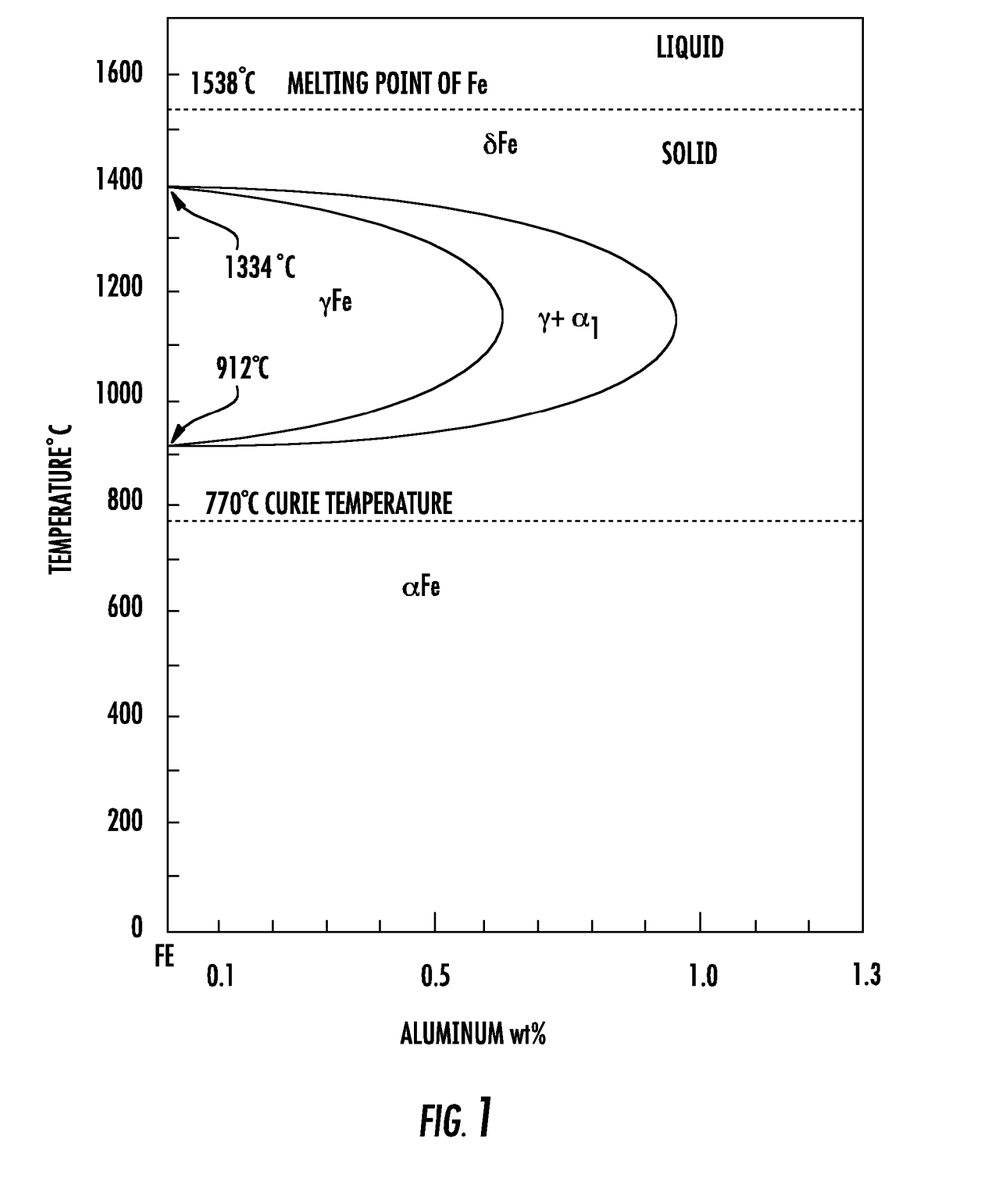
FIG. 1 is a phase diagram of Fe-Al.
Figure 2:
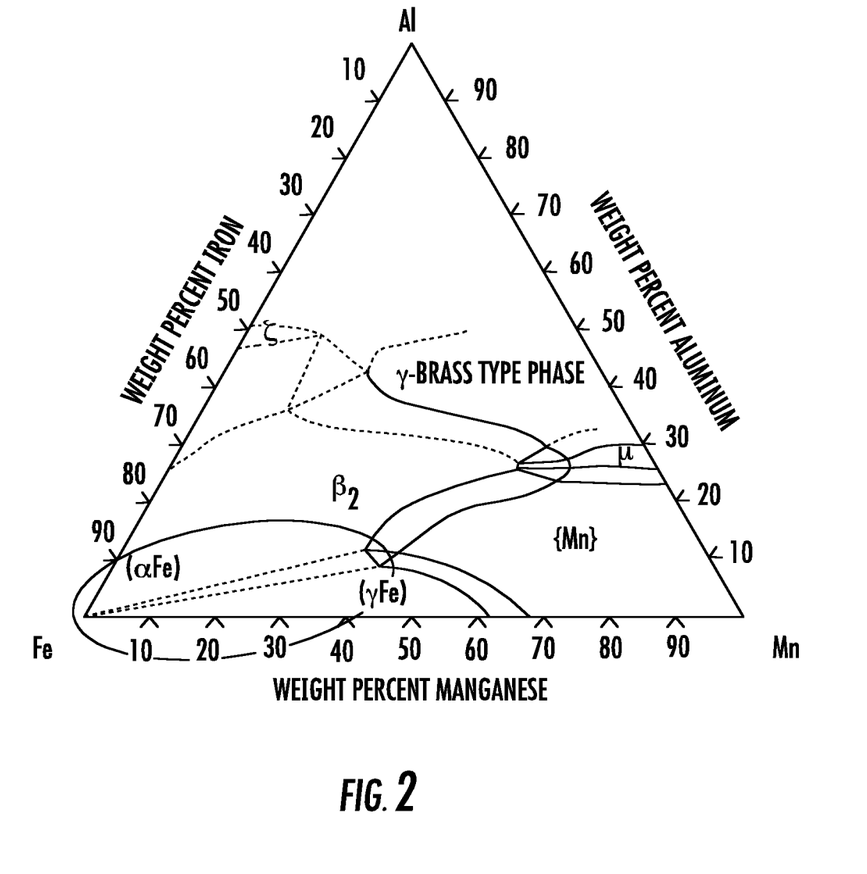
FIG. 2 is a ternary phase diagram section of Fe—Al—Mn at 1000° C.

When a large amount of aluminum is introduced into a steel weld by self-shielded flux-cored arc welding, the steel weld can be over-saturated by aluminum. According to FIG. 1, if [Al] is over 1 wt. % in welds, large delta ferrite grains can be inherited from the liquid solidification. Coarse grains of delta ferrite can significantly deteriorate the Charpy V-notch impact toughness. According to FIG. 2, an appropriate amount of manganese in steel can effectively expand the aluminum saturation region to promote the phase transformation from delta ferrite to austenite and alpha ferrite to result in grain refinement. Considering the [Mn] limit in welds specified by various welding consumable codes, a 1.1-1.45 wt. % [Mn] in welds has been found to be effective for achieving over 100 ft-lbs Charpy V-notch impact toughness at −40° F.

EXAMPLES

5/64" ESAB E71T-8 type self-shielded FCAW wire was employed to serve as a base formula for the investigation. The example flux cored wires were manufactured using cold-rolled strip (a low carbon steel) with modified flux values as indicated. A typical weight percent or fill ratio of the flux mixes was about 20.75%. Lubricants were applied to the samples for proper manufacturing and wire feedability.

All welding plates were prepared at 1G position per AWS A5.29 using the Esab Origo Mig 6502C welding machine coupled with the Feed 3004 wire feeder. For all plate welding, welding parameters used were 19.5V, 250A, 14 inch-per-minute (ipm) travel speed and a 7/8" electrode extension. The same welding parameters were used to prepare chempads to determine the chemical composition of each weld. Each welding plate was subjected to a radiographic examination. After radiographic examination was satisfied, specimens for tension and Charpy V-notch impact tests were extracted from each plate and machined per AWS A5.29. In addition, a macro sample was cut out at the middle of each plate.

After mechanical properties including tensile strength and CVN impact toughness at −40° F. were evaluated, weld metal microstructure at the cap layer of each macro sample was investigated using an optical microscope (Olympus PMG3). A point count quantification technique was used to determine the volume fractions of microstructural constituents in order to better understand the resultant mechanical properties. 10-15 fields were examined by a 10×10 grid on those welds. In addition, a Hitachi S-3400N SEM was used to examine microstructural constituents as required. In addition, a Jeol 6500 FEG/OIM equipped with EDAX Genesis in Oak Ridge National Laboratory was utilized for detailed SEM work on the microstructure.

In addition to the above, the wires were subjected to diffusible hydrogen tests per AWS A4.3.

Samples for Testing

As previously noted, ESAB E71T-8 type self shielded FCAW wires served as a base formula for the preparation of six sample electrodes (E1-E6). An exemplary formulation for this E71T-8 type wire is as follows:

| | |
|---|---|
| Sintered fluoride ($BaLiF_3$) | 10.00% |
| Sintered oxides ($Li_2O$—$CaO$—$SiO_2$—$Fe_3O_4$) | 4.56% |
| Sintered fluorides ($KLiF_2$) | 0.31% |
| Al | 2.02 |
| Mg | 1.84% |
| Mn | 0.83% |
| Ni | 0.85% |
| C | 0.01% |
| Fe | 0.32% |
| Steel strip | balance |

The base formula received an additional dose of rare earth metals (in oxide form) in a range from 0.001 wt. % to 0.109 wt. % in the wires (see Table I, below).

TABLE I

| REM % in wire | 0.001% | 0.004% | 0.007% | 0.036 % | 0.073% | 0.109% |
|---|---|---|---|---|---|---|
| Sample | E1 | E2 | E3 | E4 | E5 | E6 |

Figure 3:
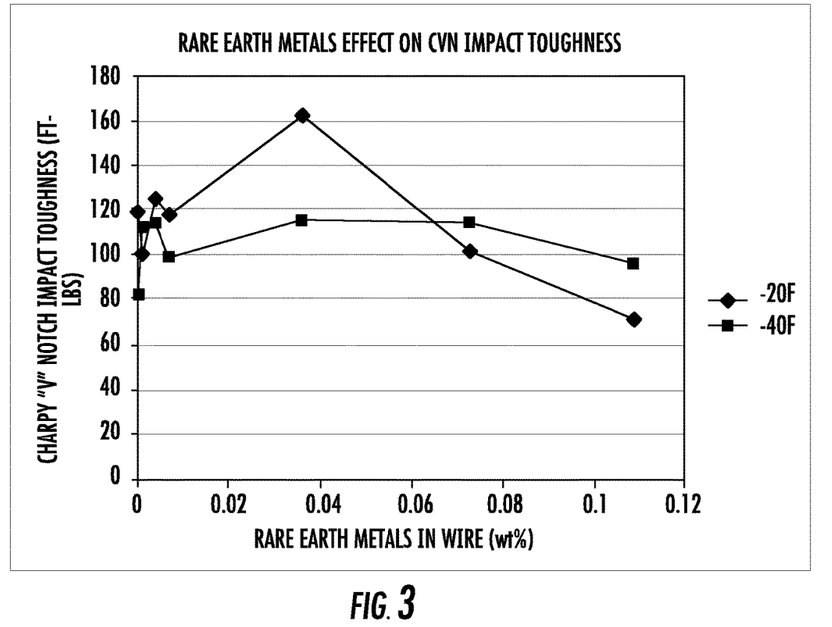
FIG. 3 is a graph showing impact toughness as a function of rare earth metal content.

Results on chemical compositions and mechanical properties of welds made using the six sample electrodes (E1-E6) are reported in Table II (below) and illustrated in FIG. 3.

TABLE II

| | Sample # | | | | | | | | | | | | | |
|---|---|---|---|---|---|---|---|---|---|---|---|---|---|---|
| | E0 | | E1 | | E2 | | E3 | | E4 | | E5 | | E6 | |
| | Formula # | | | | | | | | | | | | | |
| | NX-4601 | | NX-4900 | | NX-4899 | | NX-4898 | | NX-4897 | | NX-4858 | | NX-4859 | |
| | REM in wires | | | | | | | | | | | | | |
| | 0.000% | | 0.001% | | 0.004% | | 0.007% | | 0.036% | | 0.073% | | 0.109% | |
| Chemical composition | weld | wire | weld | wire | weld | wire | weld | wire | weld | wire | weld | wire | weld | wire |
| [C] | 0.04 | 0.03 | 0.04 | 0.03 | 0.04 | 0.03 | 0.04 | 0.03 | 0.04 | 0.03 | 0.05 | 0.03 | 0.04 | 0.03 |
| [Mn] | 1.25 | 1.23 | 1.47 | 1.28 | 1.44 | 1.28 | 1.38 | 1.28 | 1.36 | 1.28 | 1.34 | 1.28 | 1.33 | 1.28 |
| [Si] | 0.30 | 0.35 | 0.34 | 0.35 | 0.33 | 0.35 | 0.30 | 0.35 | 0.31 | 0.38 | 0.35 | 0.42 | 0.39 | 0.45 |
| [P] | 0.013 | 0.010 | 0.009 | 0.010 | 0.009 | 0.010 | 0.009 | 0.010 | 0.009 | 0.010 | 0.006 | 0.010 | 0.006 | 0.010 |
| [S] | 0.008 | 0.040 | 0.004 | 0.040 | 0.004 | 0.040 | 0.004 | 0.040 | 0.004 | 0.040 | 0.004 | 0.040 | 0.004 | 0.040 |
| [Ni] | 1.06 | 0.90 | 1.16 | 1.13 | 1.13 | 1.13 | 1.14 | 1.11 | 1.10 | 1.03 | 0.99 | 0.93 | 1.00 | 0.93 |
| [Al] | 0.85 | 1.93 | 0.76 | 1.99 | 0.72 | 1.99 | 0.86 | 1.99 | 0.82 | 1.99 | 0.80 | 1.99 | 0.83 | 1.99 |
| [H] ml/100 g | >6 ml/100 g | | 5.0 | | 5.4 | | 4.7 | | 5.0 | | 4.3 | | 4.6 | |
| Y.S. (ksi) | 61.5 | | 68.9 | | 69 | | 67.1 | | 66.4 | | 74.2 | | 71.2 | |
| UTS (ksi) | 76.1 | | 81.4 | | 82.1 | | 80.2 | | 80 | | 84.1 | | 85.1 | |
| Elongation | 30% | | 30% | | 28% | | 32% | | 32% | | 23% | | 23% | |
| CVN, −20 F. (ft-lbs) | 119 | | 100 | | 125 | | 118 | | 161 | | 101 | | 72 | |
| CVN, −40 F. (ft-lbs) | 82 | | 112 | | 114 | | 99 | | 115 | | 114 | | 96 | |

As can be seen, all six sample electrodes met the type H5 maximum diffusible hydrogen limit of 5.4 mL/100 g. Four of the six sample electrodes met the Charpy V-notch toughness limit of 100 ft-lbs. Samples E1, E4 and E5 met both requirements.

Figure 4:
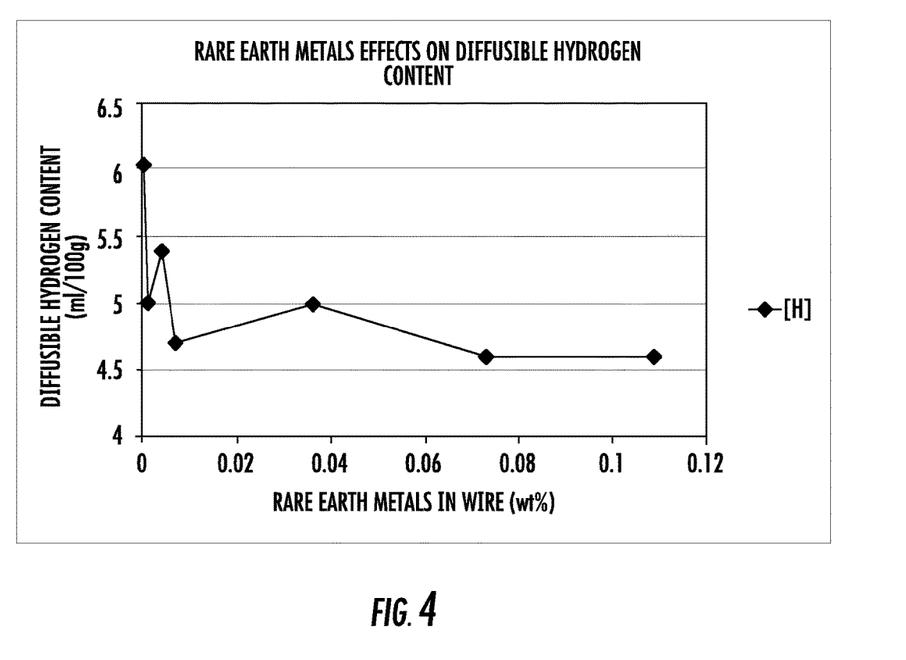
FIG. 4 is a graph showing diffusible hydrogen content in a weld as a function of rare earth metal content in a flux-cored wire.

These results show that the impact toughness at both −20° F. and −40° F. can be increased to 100 ft-lbs level by adding up to 0.109% rare earth metal in the wires. There is no doubt that the toughness improvement was obvious and effective by introducing the rare earth metals in flux formulas. Moreover, as predicted, the addition of rare earth metals can also benefit the diffusible hydrogen control in those welds. FIG. 4 shows that all those wires treated with the rare earth metals meet ABS H5 requirement for the diffusible hydrogen content in welds, i.e. less than 5.4 ml/100 g. In addition, they all qualified under the AWS A5.29 specification to meet E71T8-Ni1 J class requirements.

Exemplary Electrode Formulations

The following examples of welding electrodes within the scope of the present disclosure show that the exemplary electrodes qualify as an H5 type self-shielded flux-cored wires, with over 100 ft-lbs Charpy V-notch impact toughness at −40° F. Table III shows the composition of the flux formulas used in each of the three exemplary flux-cored electrodes (note that all percentage values in Table III are weight percentage values with respect of the total weight of wires).

TABLE III

|  | Sample | | |
| --- | --- | --- | --- |
|  | E5 | E4 | Additional |
|  | Flux Formula # | | |
|  | NX-4858 | NX-4897 | NX-4947 |
| Sintered fluoride (BaLiF3) | 9.54% | 9.13% | 9.13% |
| Sintered oxide ($Li_2O$—$CaO$—$SiO_2$—$Fe_3O_4$) | 4.53% | 4.53% | 4.51% |
| Sintered fluoride ($KLiF_2$) | 0.42% | 0.83% | 0.42% |
| Al | 2.04% | 2.10% | 2.04% |
| Mg | 1.77% | 1.77% | 1.77% |
| Mn | 1.00% | 1.01% | 0.96% |
| Ni | 0.87% | 0.98% | 0.87% |
| $ZrO_2$ | N/A | N/A | 0.44% |
| $Ce_2O_3$—$La_2O_3$—$Nd_2O_3$—$Pr_2O_3$ (or REM) | 0.21% (0.07%) | 0.10% (0.04%) | 0.07% (0.03%) |
| Iron powder | 0.36% | 0.03% | 0.53% |
| Steel strip (low carbon steel) | balance | balance | balance |

Formula NX-4858

Welds made using wires according to this formula had a [Mn] content of 1.34 wt. % and an [Al] content of 0.80 wt. % (Table II). In addition, 0.07 wt. % rare earth metals in the formulated wire yielded a weld having a diffusible hydrogen ([H]diff) of 4.3 ml/100 g, and a Charpy V-notch toughness at −40° F. of 114 ft-lbs.

Formula NX-4897

Welds made using wires according to this formula had a [Mn] content of 1.36 wt. % and an [Al] content of 0.82 wt. % (Table II). In addition, 0.04 wt. % rare earth metals in the formulated wire yielded a weld having [H]diff of 5.0 ml/100 g, and a Charpy V-notch toughness at −40° F. of 115 ft-lbs.

Alternatives can be seen in the adjustment of the weight percent of rare earth metals included in the base flux formula, for example:

Formula NX-4947

Welds made using wires according to this formula had a [Mn] content of 1.30 wt. % and an [Al] content of 0.71 wt. %. In addition, 0.03 wt. % rare earth metals in the formulated wire yielded a weld having [H]diff of 4.7 ml/100 g, and a Charpy V-notch toughness at −40° F. of 96 ft-lbs.

Adding the rare earth metals in a range from 0.001 to 0.11 wt. % in self-shielded flux cored wires can effectively lower the diffusible hydrogen content in a T8-Ni1 type weld down to an H5 level.

Adding rare earth metals in an amount ranging from 0.001 wt % to 0.11 wt. % to a T8-Ni1 type self-shielded flux cored wire can substantially improve the weld metal Charpy V-notch impact toughness. In terms of the Charpy V-notch impact toughness in this work, the optimal addition of the rare earth metals has been found to be about 0.04 wt. %.

A composition window of aluminum, manganese and rare earth metals in wires is defined to be 2.0-3.0 wt. % [Al] (which results in 0.7-1.0 wt. % [Al] in welds) and 1.0-2.0 wt. % [Mn] (which results in 1.1-1.5wt. % [Mn] in welds) and up to 0.11 wt. % rare earth metals, such as, but not limited to, La, Ce, Nd, Pr, etc.

It will be appreciated that this type wire can find application in the fabrication of offshore structures, pipeline and other steel structures.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A flux cored welding electrode comprising a ferrous metal sheath and a core within the sheath including core ingredients, the core ingredients comprising, in weight percent based on the total weight of the flux cored welding electrode:

2.0-3.0 aluminum;

1.0-2.0 manganese; and 0.001-0.35 rare earth metal oxide comprising Cerium (Ce), Lanthanum (La), Neodymium (Nd) and Praseodymium (Pr);

wherein the flux cored welding electrode is capable of yielding a weld having a diffusible hydrogen level of 5 ml/100 g or less and a Charpy V-notch toughness at −40° F. of at least 100 ft-lbs.

2. The flux cored welding electrode of claim 1, wherein the rare earth metal of the rare earth metal oxide comprises up to 0.11 wt. % of the total weight of the metal sheath and core ingredients.

3. The flux cored welding electrode of claim 1, wherein the rare earth metal oxide comprises $Ce_2O_3$—$La_2O_3$—$Nd_2O_3$—$Pr_2O_3$.

4. The flux cored welding electrode of claim 1, wherein the core ingredients further comprise, in weight percent, based on the total weight of the flux cored welding electrode:

9.54 of a first sintered fluoride;

4.53 sintered oxide;

0.42 of a second sintered fluoride;

2.04 aluminum;

1.77 magnesium;

1.00 manganese;

0.87 nickel;

0.21 $Ce_2O_3$—$La_2O_3$—$Nd_2O_3$—$Pr_2O_3$; and 0.36 iron.

5. The flux cored welding electrode of claim 4, wherein the first sintered fluoride comprises $BaLiF_3$, the sintered oxide comprises $Li_2O$—$CaO$—$SiO_2$—$Fe_3O_4$ and the second sintered fluoride comprises $KLiF_2$.

6. The flux cored welding electrode of claim 1, wherein the core ingredients further comprise, in weight percent, based on the total weight of the flux cored welding electrode:
   9.34 of a first sintered fluoride;
   4.53 sintered oxide;
   0.83 of a second sintered fluoride;
   2.10 aluminum;
   1.77 magnesium;
   1.01 manganese;
   0.98 nickel;
   0.10 $Ce_2O_3$—$La_2O_3$—$Nd_2O_3$—$Pr_2O_3$; and
   0.03 iron.

7. The flux cored welding electrode of claim 6, wherein the first sintered fluoride comprises $BaLiF_3$, the sintered oxide comprises $Li_2O$—$CaO$—$SiO_2$—$Fe_3O_4$ and the second sintered fluoride comprises $KLiF_2$.

8. The flux cored welding electrode of claim 1, wherein the core ingredients further comprise, in weight percent, based on the total weigh of the flux cored welding electrode:
   9.13 of a first sintered fluoride;
   4.51 sintered oxide;
   0.42 of a second sintered fluoride;
   2.04 aluminum;
   1.77 magnesium;
   0.96 manganese;
   0.87 nickel;
   0.44 zirconium dioxide;
   0.07 $Ce_2O_3$—$La_2O_3$—$Nd_2O_3$—$Pr_2O_3$; and
   0.53 iron.

9. The flux cored welding electrode of claim 8, wherein the first sintered fluoride comprises $BaLiF_3$, the sintered oxide comprises $Li_2O$—$CaO$—$SiO_2$—$Fe_3O_4$ and the second sintered fluoride comprises $KLiF_2$.

10. A flux composition for a cored welding electrode, the flux composition comprising, in weight percent based on the total weight of the flux cored welding electrode:
    2.0-3.0 aluminum;
    1.0-2.0 manganese; and
    0.001-0.11 rare earth metal, wherein the rare earth metal comprises a rare earth metal oxide, and wherein the rare earth metal oxide comprises Cerium (Ce), Lanthanum (La), Neodymium (Nd) and Praseodymium (Pr).

11. The flux composition of claim 10, wherein the rare earth metal oxide comprises $Ce_2O_3$—$La_2O_3$—$Nd_2O_3$—$Pr_2O_3$.

12. The flux composition of claim 10, wherein the composition comprises, in weight percent, based on the total weight of the flux cored welding electrode:
    9.54 of a first sintered fluoride;
    4.53 sintered oxide;
    0.42 of a second sintered fluoride;
    2.04 aluminum;
    1.77 magnesium;
    1.00 manganese;
    0.87 nickel
    0.07 rare earth metals; and
    0.36 iron.

13. The flux composition of claim 12, wherein the first sintered fluoride comprises $BaLiF_3$, the sintered oxide comprises $Li_2O$—$CaO$—$SiO_2$—$Fe_3O_4$ and the second sintered fluoride comprises $KLiF_2$.

14. The flux composition of claim 10, wherein the composition comprises, in weight percent, based on the total weight of the flux cored welding electrode:
    9.13 of a first sintered fluoride;
    4.53 sintered oxide;
    0.83 of a second sintered fluoride;
    2.10 aluminum;
    1.77 magnesium;
    1.01 manganese;
    0.98 nickel
    0.04 rare earth metals; and
    0.83 iron.

15. The flux composition of claim 14, wherein the first sintered fluoride comprises $BaLiF_3$, the sintered oxide comprises $Li_2O$—$CaO$—$SiO_2$—$Fe_3O_4$ and the second sintered fluoride comprises $KLiF_2$.

16. The flux composition of claim 10, wherein the composition comprises, in weight percent, based on the total weight of the flux cored welding electrode:
    9.13 of a first sintered fluoride;
    4.51 sintered oxide;
    0.42 of a second sintered fluoride;
    2.04 aluminum;
    1.77 magnesium;
    0.96 manganese;
    0.87 nickel
    0.44 zirconium dioxide
    0.03 rare earth metals; and
    0.53 iron.

17. The flux composition of claim 16, wherein the first sintered fluoride comprises $BaLiF_3$, the sintered oxide comprises $Li_2O$—$CaO$—$SiO_2$—$Fe_3O_4$ and the second sintered fluoride comprises $KLiF_2$.

18. A flux cored welding electrode comprising a ferrous metal sheath and a core within the sheath including core ingredients, the core ingredients comprising, in weight percent based on the total weight of the flux cored welding electrode:
    2.0-3.0 aluminum;
    1.0-2.0 manganese; and
    0.001-0.5 rare earth metal oxide comprising Cerium (Ce), Lanthanum (La), Neodymium (Nd) and Praseodymium (Pr);
    wherein the flux cored welding electrode is capable of yielding a weld having a diffusible hydrogen level of 5 ml/100 g or less and a Charpy V-notch toughness at −40° F. of at least 100 ft-lbs.

* * * * *